READING MACHINE

Filed April 18, 1962 2 Sheets-Sheet 1

INVENTORS
HAROLD E. HAYNES &
HARRY J. WOLL
BY
John V. Regan
Attorney.

INVENTORS
HAROLD E. HAYNES &
HARRY J. WOLL

BY

John V. Regan

Attorney 3,197,735
Patented July 27, 1965

3,197,735

READING MACHINE

Harold E. Haynes, Camden, and Harry J. Woll, Haddon Heights, N.J., assignors to Radio Corporation of America, a corporation of Delaware Filed Apr. 18, 1962, Ser. No. 188,385
18 Claims. (Cl. 340—146.3)

This invention relates to reading machines and, in particular, to apparatus for reading and recognizing numbers, letters of the alphabet, symbols, graphs and the like, all of which are termed hereinafter "characters" as a matter of convenience.

Several different techniques for the recognition of characters are known in the art. One such technique may be described generally as mask matching, in which a positive image of an unknown character is projected onto a number of negative masks, one of each character to be read by the machine. Theoretically, the amount of light passing through that negative mask which corresponds to the unknown character is a minimum, and a minimum signal then may be used as a criterion of recognition. One disadvantage of this type of system is that ambiguities often exist in the reading of certain characters, "E" and "F" for example. If a positive image of the letter "E" is projected onto negative masks of the letters "E" and "F," both of the masks block the light and the reading result may be indeterminable.

This problem has been solved in at least one system by displaying both positive and negative images of the unknown character, and comparing these images with negative and positive masks, respectively, of all of the characters to be recognized in the system. To provide both a positive and a negative display generally requires that the unknown character be scanned in a plurality of substantially parallel scans to convert the character information into electrical signals. The electrical signals may be supplied to a first scanning type display device, such as a kinescope, to generate the positive display. The electrical signals also are inverted and supplied to the same or another display device to generate the negative display. The scanning and synchronizing circuitry for producing positive and negative image displays is complex relative to the equipment needed to produce only a positive display.

It is an object of the present invention to provide a reading machine which requires only one type of image display and which is not subject to the reading ambiguities of prior art systems using one type of display.

It is another object of this invention to provide a reading machine which employs both positive and negative masks, but which requires only one type of image display.

It is still another object of this invention to provide a reading machine using both positive and negative comparison masks, which machine obviates the need for both positive and negative image displays of the unknown character.

A further object of the invention is to provide a reading machine which has a simplified character display arrangement.

The foregoing and other objects are accomplished by projecting an image of the unknown character onto a positive and negative mask of each recognizable character. The projected images are either all positive or all negative images. Comparison signals are generated corresponding to the degree of match in each instance. The comparison signals associated with the two masks of the same recognizable character are uniquely combined with a reference signal, related to the same character, to provide a signal whose amplitude is a measure of the degree of match between that character and the unknown character. The optimum one of the latter signals identifies the unknown character.

It is a feature of the invention that the images of the unknown character may be projected directly by optical techniques without the need for electronic scanning.

In the drawing, like reference characters refer to like components, and:

Figure 1:
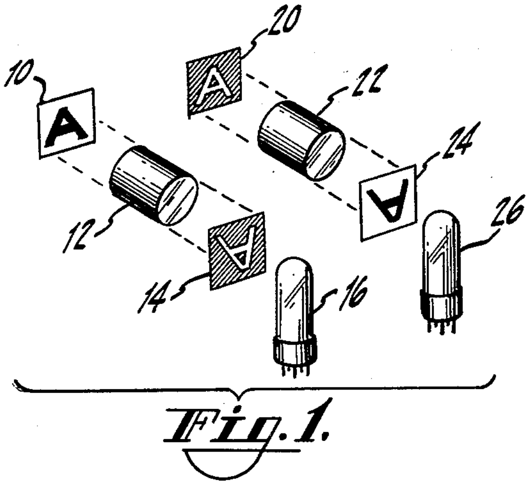
FIGURE 1 is a view in perspective illustrative of certain mask matching principles.

It is believed that the invention may be best understood by first considering certain general principles of mask matching. In FIGURE 1, a positive image 10 (black on white background) of the letter "A" is imaged by lens means 12 onto a negative mask 14 of the same character. The letter portion of the mask 14 is transparent and usually is slightly smaller than the projection of the character image thereon. The remainder of the mask 14 is opaque. Assuming a perfect match of the image with the mask 14, no light passes through the mask 14 to the photo-pickup device 16, illustrated as a tube. In the practical case, some small amount of light may pass through the mask 14 even under conditions of perfect match, due to the light transmission characteristics of the mask 14, the light reflected from the dark portion of the image 10, etc.

A negative image 20 of the character "A" is imaged by lens means 22 onto a positive mask 24 of the character. The letter portion of the mask 24 is opaque, or nearly so, and is generally made somewhat oversized as compared with the image to account for tolerances in the system, fuzzy edges on the projected image, etc. Theoretically, the pickup tube 26 receives no light when the projected character is the same as the character on the mask. In practice, the phototubes 16 and 26 often are combined in a single tube. Other positive and negative images of the character to be identified are projected onto negative and positive masks (not shown), respectively, of all other recognizable characters.

The positive-negative image and mask technique can be shown to be a true optical cross-correlation process, as follows. Consider the basic light "signal" represented by a character image 10 or 20 to be alternating current (A.C.). That is to say, the reference level is half way between total black and total white. Black then is not an absence of signal, but is rather a deviation from the reference in one direction, and white is a deviation from the reference in the opposite direction. In the case of the character display 10, the background is white and the character is black. The character is white and the background is black in the display 20.

The actual two-dimensional signal as one sees it is $$B(x,y)=\tfrac{1}{2}+\tfrac{1}{2}f(x,y) \quad (1)$$

where B is normalized brightness. The "½" factors restrict the normalized brightness to the range 0 to 1. The actual light pattern is the true signal $f(x,y)$ plus a D.C. level, where $f(x,y)$ is the signal at the coordinates $x$ and $y$. The true correlation which is sought after is that existing between the functions $f(x,y)$, and not that existing between the values of B.

If a positive image is expressed as $$B_P=\tfrac{1}{2}+\tfrac{1}{2}f_B(x,y) \quad (2)$$

then the negative image is simply $$B_N=\tfrac{1}{2}-\tfrac{1}{2}f_B(x,y) \quad (3)$$

where both $B_P$ and $B_N$ are restricted to the range 0 to 1.

Consider now that the positive image is compared with a negative mask having the transmission characteristic $$T_N=\tfrac{1}{2}-\tfrac{1}{2}f_T(x,y) \quad (4)$$

and the negative image is compared with a positive mask having the transmission characteristic $$T_P=\tfrac{1}{2}+\tfrac{1}{2}f_T(x,y) \quad (5)$$

where T is the transmission of a mask.

The light received by the phototubes 16 and 26 may be determined by multiplying $B_P$ by $T_N$ and $B_N$ by $T_P$, respectively. The total light passed by the masks 14 and 24, measured as the sum of the phototube 16 and 26 outputs, is as follows:

$$\Sigma B=[\tfrac{1}{2}+\tfrac{1}{2}f_B(x,y)][\tfrac{1}{2}-f_T(x,y)] + [\tfrac{1}{2}-\tfrac{1}{2}f_B(x,y)][\tfrac{1}{2}+f_T(x,y)] \quad (6)$$

Simplifying the above equation, $$\Sigma B=\tfrac{1}{2}-\tfrac{1}{2}f_Bf_T(x,y) \quad (7)$$

integrating over $x$ and $y$, the whole image, gives the cross-correlation. The transmitted light drops to zero if the cross-correlation is unit, indicating a perfect match. The photo-tubes 16 and 26 perform the integrating function.

It is desirable to employ both positive and negative masks in order to avoid reading ambiguities, as discussed previously. However, the apparatus and scanning circuitry required to produce both positive and negative images is complex, relative to the equipment needed for only one type of display, because of the scanning requirements and the need to convert the information to electrical signals. According to the present invention, illustrated in FIGURE 2, the result achieved in the positive-negative image display system of FIGURE 1 can be achieved using only one type of image display, positive for example. The unknown character is projected onto the negative and positive masks 14 and 24 of the character "A" by means of a partially transmitting mirror 30 and lenses 12 and 22. The mirror 30 is located in a plane which intersects the plane of the character 10 at an angle of 45°. In an actual system, of course, the positive image is projected onto positive and negative masks (not shown) of all of the characters recognizable in the system.

The result of the comparison between the positive image $B_P$ of the character 10 and the positive mask 24 is $$B_P\times T_P=[\tfrac{1}{2}+\tfrac{1}{2}f_B(x,y)][\tfrac{1}{2}+\tfrac{1}{2}f_T(x,y)] =\tfrac{1}{4}+\tfrac{1}{4}f_B(x,y)+\tfrac{1}{4}f_T(x,y)+\tfrac{1}{4}f_Bf_T(x,y) \quad (8)$$

In like manner, the result of the comparison between the positive image and the negative mask 14 is $$B_P\times T_N=[\tfrac{1}{2}+\tfrac{1}{2}f_B(x,y)][\tfrac{1}{2}-\tfrac{1}{2}f_T(x,y)] =\tfrac{1}{4}+\tfrac{1}{4}f_B(x,y)-\tfrac{1}{4}f_T(x,y)-\tfrac{1}{4}f_Bf_T(x,y) \quad (9)$$

Subtracting Equation 8 from Equation 9 yields $$B_PT_N-B_TT_P=-\tfrac{1}{2}f_T(x,y)-\tfrac{1}{2}f_Bf_T(x,y) \quad (10)$$

The function $T_P=\tfrac{1}{2}+\tfrac{1}{2}f_T(x,y)$, which is a fixed quantity, is now added to Equation 10 as follows:

$$B_PT_N-B_TT_P+T_P=\tfrac{1}{2}f_T(x,y)-\tfrac{1}{2}f_Bf_T(x,y) +\tfrac{1}{2}+\tfrac{1}{2}f_T(x,y) \quad (11)$$

Simplifying Equation 11 yields $$B_PT_N-B_PT_P+T_P=\tfrac{1}{2}-\tfrac{1}{2}f_Bf_T(x,y) \quad (12)$$

Figures 2, 7:
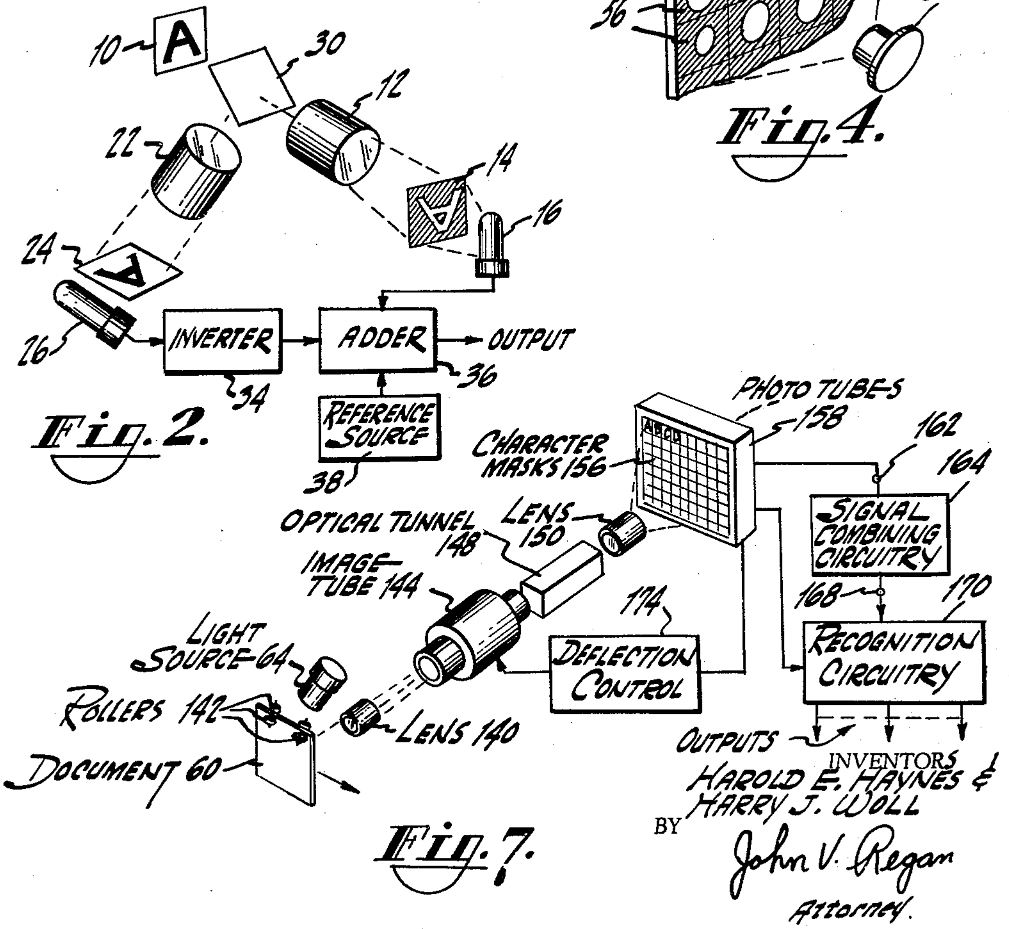
FIGURE 2 is a view, partly in perspective and partly in block form, of an embodiment of the invention.
FIGURE 7 is a diagram of another reader system which includes the present invention.

It will be recognized that the result in Equation 12 is identical to that of Equation 7, although only a positive image is displayed in FIGURE 2. Equation 10 is mechanized in the FIGURE 2 arrangement by inverting the output of the phototube 26 and adding the inverter 34 output to the output of the phototube 16 in an adder 36. Equation 12 is mechanized by applying a fixed voltage, simulating the function $T_P$, from a reference source 38 to the adder 36. The output of the adder 36 is the integral of the desired function formulated in Equation 12. Other, similar comparison circuits (not shown), each including an inverter and an adder, are provided for each of the other pairs of masks associated with the other recognizable characters.

In FIGURE 2, the inverter may be a common emitter transistor circuit, suitably biased. The reference signal source 38 may be, for example, a voltage divider having taps thereon for providing a number of different, fixed reference voltages, one for each of the character comparison circuits. The adder 36 may be, for example, a resistance network for summing the outputs of the phototube 16, inverter 34 and reference source 38. The adder 36, the inputs of which may be weighted to compensate for losses in the various input lines thereto, also may have amplification means.

Figure 3:
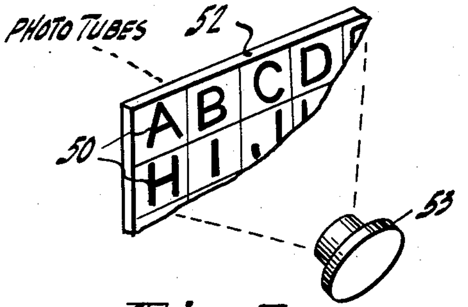
FIGURES 3 and 4 are views illustrative of two different methods of generating certain reference voltages which may be used in practicing this invention.

The $T_P$ functions for the various positive masks generally differ in value, although some may be the same, depending upon the character font. The $T_P$ functions are related to the areas of the characters carried on the masks. The various reference voltages which simulate the $T_P$ functions also may be generated in the manner illustrated in FIGURE 3. Positive masks 50, one for each recognizable character, are arrayed in a common plane and form the front face of a light tight box 52, shown in fragmentary view for purposes of convenience. A number of photo-sensitive devices (not shown), one for each of the masks 50, are located within the box 52 and positioned behind respective masks. Preferably the box 50 is compartmentalized so that each of the photo-sensitive devices receives only the light which passes through its associated mask 50. The entire array of masks 50 is uniformly illuminated by light of constant intensity from a source 53. The intensity of the light is the same as that of the white background light of the projected image (FIGURE 2). It will be understood, however, that no character image is projected on the array of FIGURE 3.

Figure 4:
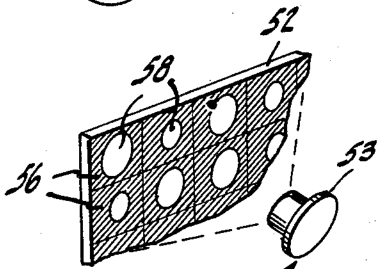

An alternative arrangement for generating the $T_P$ functions is illustrated in fragmentary view in FIGURE 4. The masks 50 of FIGURE 3 perform no comparison function and serve to transmit light in amounts related to the sizes of the various characters. Accordingly, the masks need not contain the outlines of the characters themselves. In FIGURE 4, the masks 56 are opaque with transparent circular portions 58. The ratio of transparent to opaque area of any mask 56 is the same as that of the corresponding mask 50 of FIGURE 3.

Figure 5:
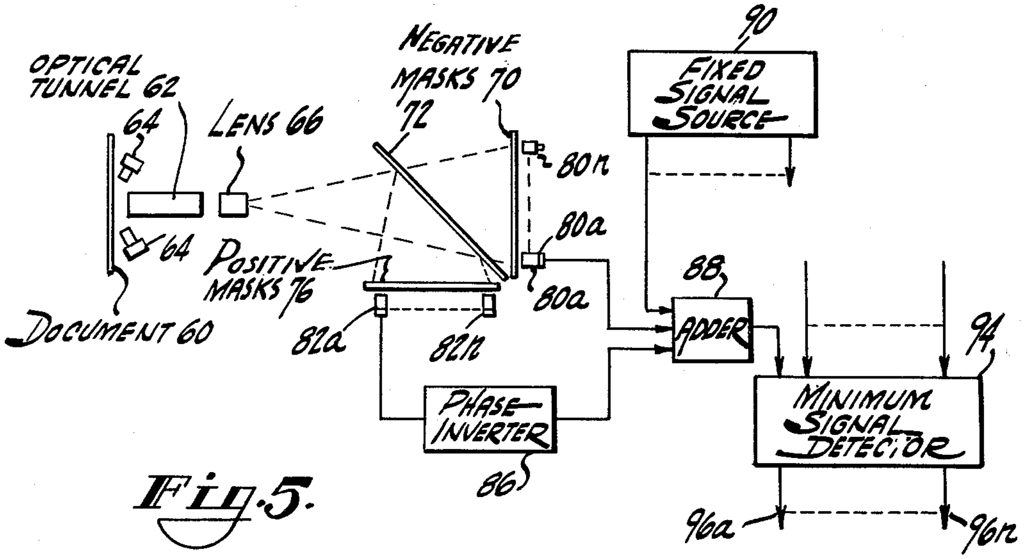
FIGURE 5 is a block diagram of a reader system which includes the present invention.

A more detailed example of an embodiment of the present invention is illustrated in FIGURE 5 by way of example. A document 60 containing printed characters to be read is moved in front of an optical tunnel 62 and illuminated by light sources 64. The characters are assumed to be black on a white background. The characters to be read are presented to the optical tunnel 62 serially as the document 60 is moved in front of the tunnel 62. If desired, the document may be held stationary and scanning accomplished by rotating mirrors or other suitable optical means (not shown). The optical tunnel 62 may be a four-sided array of flat mirrors permanently bonded to retain precise optical dimensions. Optical tunnels and their characteristics are known and are described, for example, in an article in the "RCA Engineer," volume 7, No. 2, August-September 1961, at page 36 and in other publications. The tunnel 62 produces multiple reflections of the image passing through it and, by means of a lens 66, projects a multiplicity of images of the unknown character in a symmetrical array onto an array of negative correlation masks 70. A partially transmitting mirror 72 is located between the lens 66 and negative masks 70 and serves to split the optical beam and image the array of presented characters onto an array of positive correlation masks 76. The mirror 70 is illustrated by way of example only as one type of device which may be used to split the optical beam. The mirror 70 may be dispensed with if both the positive and negative masks are arranged in a common array, as shown in FIGURE 7. The negative array 70 contains a negative mask of each of the recognizable characters, and the positive array 76 contains a positive mask of each of the recognizable characters. The respective character orientations on the mask 70 (and 26) are arranged to correspond with the character orientations produced by the optical tunnel 62 due to the different number of reflections of the transmitted character. The optical tunnel 62 and lens 66 cause a positive image of the unknown character to be presented simultaneously to each one of the individual positive and negative masks for comparison.

Separate photosensitive pickup devices 80 and 82 are provided for each of the masks in the individual arrays 70 and 76, respectively, although only a few of the devices are illustrated in the drawing. It is assumed that the photosensitive devices 80 and 82 which have the same alphabeitc designation are associated with the negative and positive masks, respectively, of the same character. The output of the photosensitive device 82*a* is supplied to an inverter 86, the output of which is fed to one input of an analog adder 88.

The adder 88 also receives as inputs the output of the photosensitive device 80*a* and a fixed reference signal from a source 90. The source 90 may be any of the devices illustrated in FIGURES 3 and 4 or a voltage divider. The output of the adder 88 is the integral of the function given in Equation 12. Similar phase inverters 86 and adders 88 (not shown) also are provided for each of the other related pairs of photosensitive devices 80 and 82 associated with the masks of other characters.

In the ideal case, that adder 88 which is associated with the masks of the same character as the character being read on the document 60 has no output. All other adders 88 have an output which is a measure of the degree of mismatch between the unknown character and the character of the associated masks. In a practical case, a perfect match is often not possible but, in any event, the adder 88 which has the minimum output identifies the unknown character. The outputs of all of the adders 88 are supplied as inputs to a minimum signal detector 94, which provides a signal on one of its output lines 96 to identify the unknown character. Each output line is associated with a different character.

Figure 6:
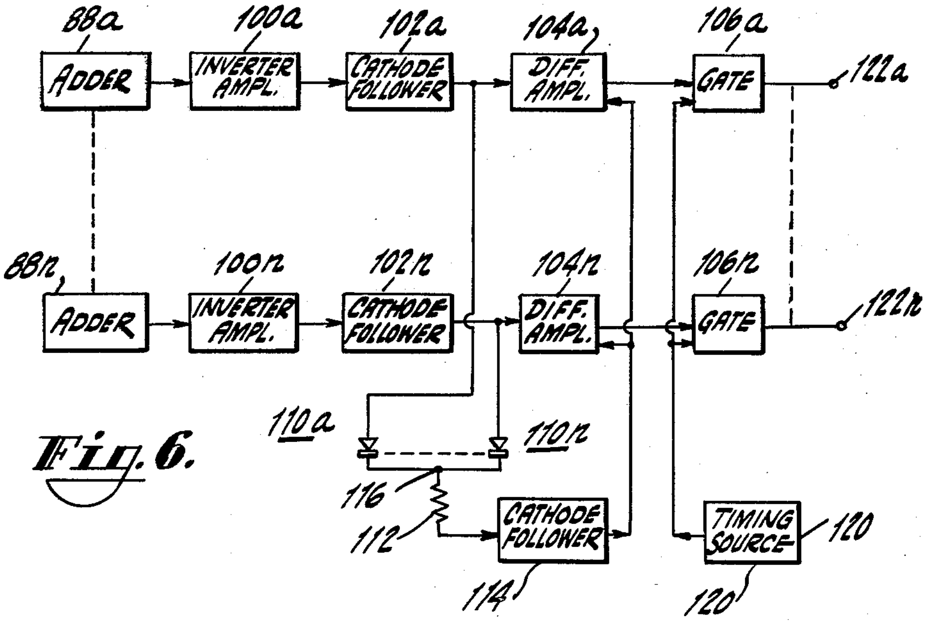
FIGURE 6 is a block diagram of a minimum signal detector employed in the diagram of FIGURE 5.

Various known minimum signal detectors may be used in the system of FIGURE 5. By way of example only one known system is illustrated in block form in FIGURE 6. Assume that the adder 88*a* is connected to those photosensitive devices 80*a*, 82*a* (FIGURE 5) which are positioned behind the positive and negative masks, respectively, of the letter "A." Assume further that the unknown character being read is the letter "A." The output of this adder 88*a* then is zero, or at least a minimum positive voltage. The outputs of all of the other adders 88*b* . . . 88*n* are more positive than the adder 88*a* output at this time. The outputs of all of the adders 88*a* . . . 88*n* are inverted in inverting amplifiers 100*a* . . . 100*n* and supplied to cathode followers 102*a* . . . 102*n*, respectively. The cathode follower 102*a* . . . 102*n* outputs are applied to first inputs of a like number of difference amplifiers 104*a* . . . 104*n*, the outputs of which serve as first inputs to a number of associated two-input coincidence gates 106*a* . . . 106*n*, respectively. The outputs of the cathode followers 102*a* . . . 102*n* also are supplied to the anodes of different diodes 110*a* . . . 110*n*, respectively. The cathodes of these diodes are connected in common to a junction 116 and to one end of an attenuating resistor 112, the other end of which is connected to the input of a cathode follower 114. The output of the cathode follower 114 is supplied as a reference input to all of the different amplifiers 104*a* . . . 104*n*.

Because of the inversion provided by the amplifiers 100*a* . . . 100*n*, the output of the cathode follower 102*a* is more positive than the outputs of the other cathode followers 102*b* . . . 102*n* when the character "A" is being read. The diodes 110*a* . . . 110*n* are so poled that only the most positive voltage is delivered to the junction 116. This voltage is slightly attenuated by the resistor 112. The output voltage of the cathode follower 114 then is slightly less positive than the output of the cathode follower 102*a*, but is more positive than the outputs of all of the other cathode followers 102*b* . . . 102*n*. Accordingly, only the difference amplifier 104*a* provides an output signal of the proper amplitude and polarity to enable its associated gate 106*a* when the second input to the latter is present. A timing source 120 supplies second inputs to all of the gates 106*a* . . . 106*n* in timed synchronism with the scanning of the document 60 (FIGURE 5). An output signal appears only at the output terminal 122*a* of the gate 106*a* when a timing signal is applied, since none of the other gates 122*b* . . . 122*n* is enabled. If any other character is being read, a signal will appear at the corresponding output terminal to identify the character.

FIGURE 7 is a view, partly in perspective and partly in block form, of another reader system in which the invention may be practiced. Characters on the document 60 are imaged serially timewise on the photocathode of an image tube 144, by lens means 140, as the document 60 is moved in the indicated direction by pairs of document feed rollers 142. The tube 144 may be, for example, an image converter tube of the type described in an article in the "RCA Review," volume XVIII, September 1957, at page 322. The image converter tube, as described in the article, has a fluorescent screen at the opposite end of the tube 144 on which the image presented at the photocathode is reproduced. The position of the image reproduced on the screen may be controlled by deflection voltages applied to the tube 144.

An optical tunnel 148 as positioned adjacent the fluorescent screen of the tube 144. The tunnel 148, as described previously, produces multiple reflections of the image and, by means of a lens 150, projects a multiplicity of images of the character being read onto an array of masks 156. The masks 156 are arrayed in a plane and form the front face of a light tight box 158. It is assumed that the array includes both the positive and negative masks of the recognizable characters, together with certain special masks to be described. Photosensitive devices (not shown) are located within the box, one behind each of the masks 156.

The outputs of the photosensitive devices associated with the character masks are supplied over a multichannel cable 162 to a signal combining circuitry unit 164. This unit 164 includes the phase inverters 86, adders 88 and fixed signal source 90 illustrated in FIGURE 5 and described previously. The outputs of the adders are supplied over a multichannel cable 168 to a recognition circuitry unit 170 which may be, for example, a minimum signal detector arrangement. A signal appearing on one of the output lines of the recognition circuitry unit 170 identifies the character being read.

It is contemplated that one of the masks 156 may be opaque, except for a thin transparent strip. The photosensitive device positioned behind this mask detects the leading edge of a character being read and supplies a timing signal to the recognition circuitry unit 170. This signal may enable output gates of the type illustrated in FIGURE 6. The transparent stirp is so located on the mask that the timing pulse is generated when the character is in reading position.

Two other masks may be provided in the array to compensate for vertical misregistration of the character being read on the document 60. Each of these masks may be opaque with a transparent strip. The photosensitive device positioned behind one of these masks detects when the character is vertically misaligned in the upward direction. The photosensitive device associated with the other mask detects when the character is vertically misaligned in the downward direction. The outputs of these photosensitive devices are supplied to the deflection control unit 174, and serve to adjust the deflection voltage to reposition the character image at the proper registration location on the fluorescent screen of the image tube 144.

Although not part of the present invention, it will be understood that the lens 140 may be positioned to image an entire, stationary document 60 on the photocathode of the image tube 144. Programmed signals then may control the deflection voltage of the image tube 144 to cause the characters to be presented serially at the input of the optical tunnel 148.

The invention has been described and illustrated as reading a positive character image by using positive and negative masks and reference voltages related to the transmission properties of the positive masks. By rearranging the various equations given previously, it may be seen that negative character images may be read and recognized using positive and negative correlation masks and reference voltages related to the transmission properties of the negative masks.

What is claimed is:

1. In a character recognition system, the combination comprising:
- a positive mask and a negative mask of each character recognizable in said system;
- means for comparing similar images of the same unknown character with each said mask;
- means producing pairs of signals, each signal of a pair corresponding to the degree of match between a different one of said images and a different one of the masks for the same said recognizable character;
- means providing a number of reference signals each having an amplitude related to a different recognizable character;
- and signal combining means for combining each of said reference signals with the related said pair of signals.

2. In a character recognition system, the combination comprising:
- a positive mask and a negative mask of each recognizable character;
- means for comparing a like image of an unknown character with each said mask and for providing pairs of comparison signals, the two signals of each pair corresponding, respectively, to the degree of match for the pair of masks of the same said recognizable character with said image;
- means producing a number of different fixed voltages, each having an amplitude related to the area of a different recognizable character;
- and signal combining means for combining each of said fixed voltages with the related said pair of comparison signals.

3. A character recognition system comprising:

- a plurality of masks including a positive mask and a negative mask of each character recognizable in said system;
- means for comparing the same one type of image of a character to be identified with each said mask, and for providing a comparison signal corresponding to the degree of match in each instance;
- means producing a number of different reference signals each having an amplitude related to the transmission characteristic of a different mask, and each said different mask of the same class, positive or negative;
- signal combining means for combining each of said reference signals with the two related comparison signals and for providing an output signal for each combination;
- and means for detecting the optimum one of said output signals.

4. In a character recognition system, the combination comprising:
- a set of positive masks, one of each character recognizable in the system;
- a set of negative masks, one of each character recognizable in the system;
- means for comparing a similar image of a character to be recognized with each one of the masks of each said set, and for providing a comparison signal corresponding to the degree of match in each instance;
- means for inverting the comparison signals derived from one said set of masks;
- means producing a number of different reference each related in value to the area of a different recognizable character;
- and means for adding the inverted and noninverted comparison signals, which are derived from the masks of the same character in said one set and the other said set, respectively, and the corresponding one of said fixed voltages.

5. A character recognition system comprising:
- a set of positive masks and a set of negative masks, including one positive mask and one negative mask of each character recognizable in the system;
- means for comparing the same type of image of a character to be recognized with each of the masks of each said set, and for providing a comparison signal corresponding to the degree of match in each instance;
- means for inverting the comparison signals derived from one said set of masks;
- means providing a number of different fixed voltages each having a magnitude related to a different recognizable character;
- means for adding the inverted and noninverted comparison signals, derived from the masks of the same character in said one set and the other said set, respectively, and the corresponding one of said fixed voltages to produce a sum signal;
- and means for detecting the optimum said sum signal.

6. A character recognition system comprising:
- a set of positive correlation masks, one of each character recognizable in the system;
- a set of negative correlation masks, one of each character recognizable in the system;
- means for comparing similar images of an unknown character to be recognized with each of the masks of each said set, and for producing a comparison signal corresponding to the degree of match in each instance;
- means for inverting the comparison signals derived from one said set of masks;
- means for producing a number of different reference signals each related in magnitude to the transmission characteristic of a different one of said masks in said one set of masks;
- and means for adding the inverted and noninverted comparison signals, derived from the masks of the same character in said one set and the other said set, respectively, and the corresponding one of said reference signals.

7. A character recognition system comprising:
a set of positive correlation masks, one of each character recognizable in the system;
a set of negative correlation masks, one of each character recognizable in the system;
means for comparing the same type of image of an unknown character to be recognized with each of the masks of each said set, and for producing a comparison signal corresponding to the degree of match in each instance;
means for inverting the comparison signals derived from one said set of masks;
means producing a number of different reference signals each related to the transmission characteristic of a different one of said masks in said one set of masks;
means for adding the inverted and noninverted comparison signals, derived from the masks of the same character in said one set and the other said set, respectively, and the corresponding one of said reference signals to produce a sum signal;
and means for detecting the optimum said sum signal.

8. In a reading machine:
optical means for projecting a similar image of an unknown character onto each of a plurality of masks, said plurality including both a positive mask and a negative mask of each character readable by said machine;
photosensitive means respectively for said masks responsive to the light passing therethrough;
means for producing a number of different signals of constant value, each related in value to the area of a different readable character;
and signal combining means connected to receive the outputs of the two photosensitive means associated with the positive and negative masks of the same readable character and the associated signal of constant value.

9. In a reading machine:
means to illuminate a character to be recognized;
optical means for projecting a like image of said character onto each of a plurality of masks, said plurality including both a positive mask and a negative mask of each character recognizable by said machine;
photosensitive means respectively for said masks responsive to the light passing therethrough;
means for producing a number of different signals of constant value, each related to the area of a different recognizable character;
and signal combining means connected to receive the outputs of the two photosensitive means associated with the positive and negative masks of the same recognizable character and the associated signal of constant value.

10. In a reading machine:
optical means for projecting a similar type image of an unknown character to be recognized simultaneously onto each of a plurality of masks, said plurality including both a positive mask and a negative mask of each character readable by said machine;
photosensitive means respectively for said masks responsive to the light passing therethrough;
means for producing a number of different signals of constant value, each related to the area of a different readable character;
and signal combining means connected to receive the outputs of the two photosensitive means associated with the positive and negative masks of the same readable character and the associated signal of constant value.

11. A character recognition apparatus comprising:
optical means for displaying a plurality of images of a character to be recognized, said images being either all positive or all negative;
a positive mask and a negative mask, of each character recognizable by the apparatus, each arranged to be compared with a different one of said displayed images;
a number of light responsive means, each producing an output signal corresponding to the degree of match between a different mask and an image;
means providing a number of reference signals each having a magnitude related to the optical transmission characteristic of a different mask, each said different mask being a positive mask when said images are positive, and being a negative mask when said images are negative;
and means for combining each of said reference signals with the outputs of the two photosensitive means associated with the same one of the recognizable characters.

12. A character recognition apparatus comprising:
optical means for displaying a plurality of images of a character to be recognized, said images being either all positive or all negative;
a positive mask and a negative mask, of each character recognizable by the apparatus, each arranged to be compared with a different one of said displayed images;
a separate light detecting means for each said mask;
means providing a number of different reference signals, each being related in magnitude to the area of a different recognizable character;
and signal combining means responsive to the output of the two light detecting means associated with the masks of the same recognizable character and the corresponding one of said reference signals.

13. A character recognition apparatus comprising:
optical means for displaying a plurality of images of a character to be recognized, said images being either all positive or all negative;
a positive mask and a negative mask, of each character recognizable by the apparatus, each arranged to be compared with a different one of said displayed images;
photosensitive means respectively for the masks responsive to the light passing therethrough;
means providing a number of different reference signals each related in magnitude to the light transmissivity of a different mask of the same class of positive and negative masks;
means for combining, in a predetermined manner, each of said reference signals with the outputs of the two said photosensitive means associated with the same said recognizable character and for providing an output signal for each combination;
and means responsive to the output signals for detecting the optimum one of said output signals.

14. A character recognition apparatus comprising:
means for illuminating a character to be recognized;
optical means for displaying a plurality of images of said character, said images being either all positive images or all negative images;
a positive mask and a negative mask for each recognizable character, each arranged to be compared with a different one of said displayed images;
a separate detecting means for each said mask providing a signal corresponding to the degree of match in each instance;
means providing a number of different reference voltages, each being related to a different recognizable character;
and signal combining means responsive to the output of the two said detecting means associated with the same recognizable character and the corresponding one of said reference voltages.

15. A character recognition apparatus comprising:
optical means for displaying a plurality of images of a character to be recognized, said images being either all positive images or all negative images;
a set of positive masks and a set of negative masks of all recognizable characters, each mask being arranged to be compared with a different one of said images;
a separate detecting means for each of said masks producing a comparison signal indicative of the degree of match in each instance;
means for inverting the comparison signals derived from one said set of masks;
means producing a number of different reference signals, each related to the light transmission characteristic of a different mask of the same said set of masks;
and means for adding the inverted and noninverted comparison signals, derived from the masks of the same character in said one set and the other said set, respectively, and the corresponding one of said reference signals.

16. A character recognition apparatus comprising:
optical means for displaying a plurality of images of a character to be recognized, said images being either all positive or all negative images;
a set of positive masks and a set of negative masks of all recognizable characters, each mask being arranged to be compared with a different one of said images;
a separate detecting means for each of said masks producing a comparison signal indicative of the degree of match in each instance;
means for inverting the comparison signals derived from one said set of masks;
means producing a number of different reference signals, each related in magnitude to a different one of said recognizable characters;
means for adding the inverted and noninverted comparison signals, derived from the masks of the same character in said one set and the other said set, respectively, and the corresponding one of said reference signals to produce a sum signal;
and means for detecting the optimum said sum signal.

17. A character recognition apparatus comprising:
optical means for displaying a plurality of images of a character to be recognized, said images being either all positive images or all negative images;
a set of positive masks and a set of negative masks of all recognizable characters, each mask being arranged to be compared with a different one of said images;
a separate detecting means for each of said masks producing a comparison signal indicative of the degree of match in each instance;
means for inverting the comparison signals derived from one said set of masks;
means producing a number of reference signals each related to the light transmission properties of a different one of the masks in the same set of masks;
and means for adding the inverted and noninverted comparison signals, derived from the masks of the same character in said one set and the other said set, respectively, and the corresponding one of said reference signals.

18. A character recognition apparatus comprising:
optical means for displaying a plurality of images of a character to be recognized, said images being either all positive or all negative images;
a set of positive masks and a set of negative masks of all recognizable characters, each mask being arranged to be compared with a different one of said images;
a separate detecting means for each of said masks producing a comparison signal indicative of the degree of match in each instance;
means for inverting the comparison signals derived from one said set of masks;
means producing a number of reference signals each related to the light transmission properties of a different one of the masks in one set of said masks;
means for adding the inverted and noninverted comparison signals, derived from the masks of the same character in said one set and the other said set, respectively, and the corresponding one of said reference signals to produce a sum signal;
and means for detecting the optimum said sum signal.

References Cited by the Examiner

UNITED STATES PATENTS

| | | | |
|---|---|---|---|
| 2,919,425 | 12/59 | Ress et al. | 340—149 |
| 3,085,227 | 4/63 | Brown | 340—146.3 |

MALCOLM A. MORRISON, *Primary Examiner.*